(12) United States Patent
Mangerson

(10) Patent No.: US 6,661,542 B1
(45) Date of Patent: Dec. 9, 2003

(54) DISPLAY AND SCANNING ASSEMBLY

(75) Inventor: Mark M. Mangerson, LeMars, IA (US)

(73) Assignee: Gateway, Inc., Poway, CA (US)

( * ) Notice: Subject to any disclaimer, the term of this patent is extended or adjusted under 35 U.S.C. 154(b) by 616 days.

(21) Appl. No.: 09/643,928

(22) Filed: Aug. 23, 2000

(51) Int. Cl.$^7$ .............................. H04N 1/04; G09G 3/36; G09G 5/00
(52) U.S. Cl. ....................... 358/484; 358/474; 358/471; 345/104; 345/207
(58) Field of Search ................................. 358/484, 474, 358/471, 400, 472, 473, 497, 505, 475, 509; 382/312, 313; 345/207, 102, 87, 88, 104; 710/73

(56) References Cited

U.S. PATENT DOCUMENTS

| | | | | |
|---|---|---|---|---|
| 5,243,332 A | * | 9/1993 | Jacobson | 345/44 |
| 5,327,503 A | * | 7/1994 | Kiyohara | 382/321 |
| 5,331,434 A | * | 7/1994 | Kikinis | 358/474 |
| 5,416,610 A | * | 5/1995 | Kikinis | 358/474 |
| 5,430,462 A | * | 7/1995 | Katagiri et al. | 345/104 |
| 5,585,817 A | * | 12/1996 | Itoh et al. | 345/104 |
| 5,966,112 A | * | 10/1999 | Katagiri et al. | 345/104 |
| 5,979,764 A | | 11/1999 | Swyst et al. | 235/462.2 |
| 6,002,387 A | | 12/1999 | Ronkka et al. | 345/157 |
| 6,005,990 A | | 12/1999 | Barrett et al. | 382/323 |
| 6,036,098 A | | 3/2000 | Goldman et al. | 235/486 |
| 6,041,374 A | | 3/2000 | Postman et al. | 710/73 |
| 6,559,827 B1 | * | 5/2003 | Mangerson | 345/102 |

* cited by examiner

Primary Examiner—Cheukfan Lee
(74) Attorney, Agent, or Firm—Scott Charles Richardson; Kevin E. West; Suiter-West

(57) ABSTRACT

A display and scanning assembly wherein light reflected from an image being scanned is transmitted to an optical sensor through an optical shutter assembly via a light guide assembly is disclosed. The optical shutter assembly is made substantially opaque except for one or more selected optical shutter elements that are made substantially transparent or opened. Light is then reflected from the medium containing the image to be scanned through substantially transparent shutter element or elements and transmitted to the optical sensor via a light guide assembly. The image may then be scanned by advancing selection of shutter element or elements that are opened across the medium. The optical scanning assembly may further be capable of functioning as a display assembly wherein color components for each display element or pixel of the display assembly are premixed so that the display elements provide a true color instead of separate red, green and blue components of that color.

40 Claims, 12 Drawing Sheets

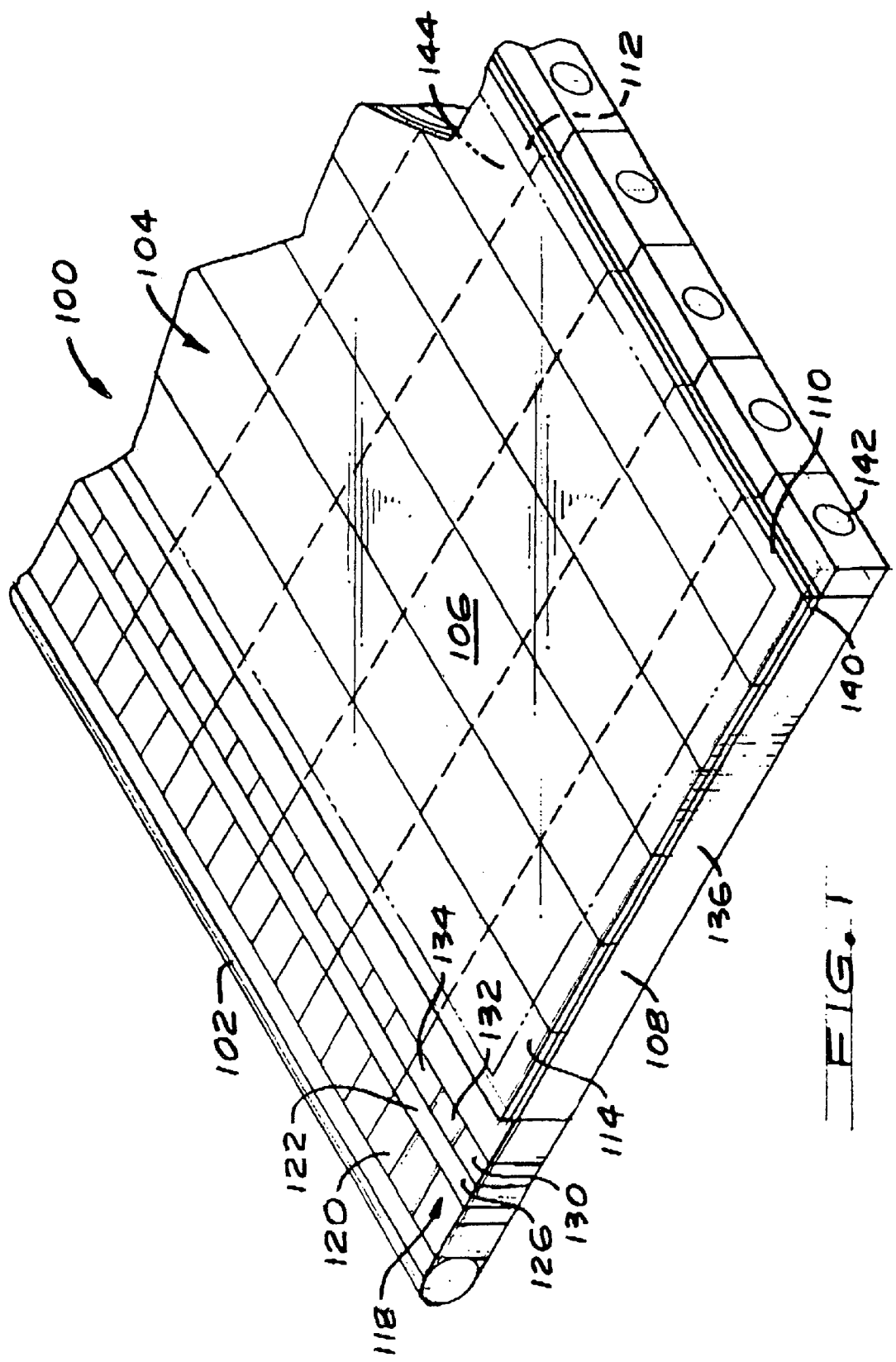

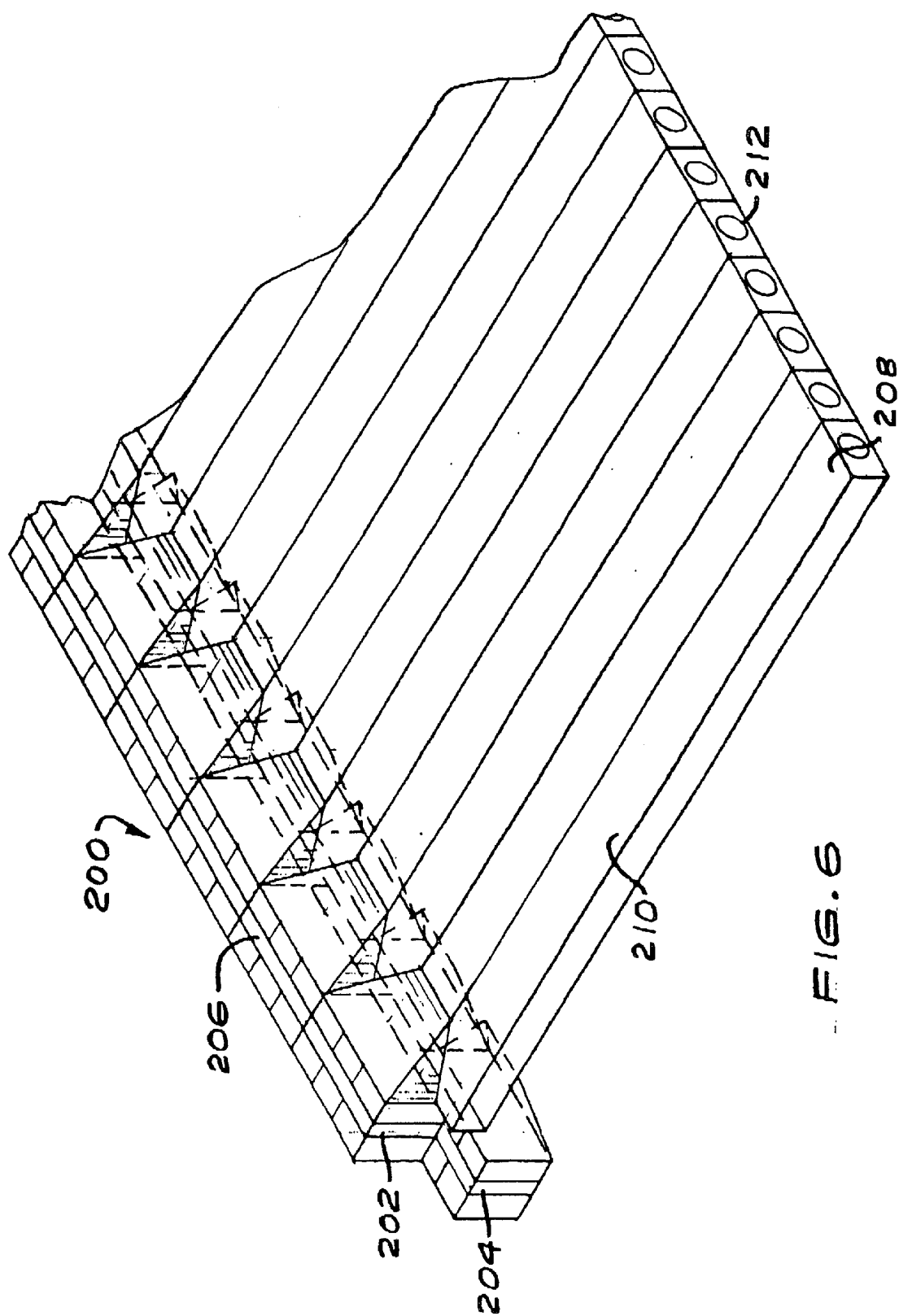

DISPLAY AND SCANNING ASSEMBLY

CROSS REFERENCE TO RELATED APPLICATIONS

U.S. patent application Ser. No. 09/639,924, filed Aug. 11, 2000, Express Mail Label No: EL 643 197 315 U.S. is herein incorporated by reference in its entirety.

FIELD OF THE INVENTION

The present invention generally relates to optical image scanning systems, and more particularly to an optical image scanning assembly wherein light reflected from an image being scanned is transmitted to an optical sensor through an optical shutter assembly via a light guide assembly. The optical image scanning assembly may also function as a display assembly wherein color components for light emitted by display elements or pixels of the display assembly are premixed and transmitted along the light guide assembly to the pixels to form the displayed image.

BACKGROUND OF THE INVENTION

Optical image scanning systems typically employ light-sensing equipment to capture an image of a subject such as indicia contained on a medium such as paper, an object, or the like. Such systems normally translate the image into a digital signal that can be manipulated by optical character recognition (OCR) software or graphics software. Optical image scanning systems are available in a number of configurations including "flat bed" wherein a scanning head is passed over the subject which is held stationary, "feed" wherein the subject is pulled across the scanning head which is held stationary, "drum" wherein the subject is rotated around a stationary scanning head, and "handheld" wherein a user passes a handheld scanning head over the subject. Optical image scanning systems are also commonly utilized in facsimile machines, photocopiers, and the like.

A common problem of existing scanning systems is the use of moving components such as gears, motors and the like to move the scanning head containing the light sensing equipment relative to the subject being scanned. Such moving components are subject to slippage, inaccuracy, breakage and/or wear which may cause the scanning system to not function properly. Known to the art are image scanning systems which project an image on a document onto an optical sensor through an optical shutter by passing light through the document. However, such systems are limited to use with thin media, such as thin paper, wherein the media is capable of becoming at least translucent when placed in front of a strong light source. Such systems cannot be used to scan images from opaque media such as thick papers, cardboard, books, three-dimensional objects, and the like. Consequently, the practical usefulness of such systems is limited to applications involving the scanning and verifying the authenticity of paper currency.

Accordingly, it would be advantageous to provide an optical image scanning assembly wherein light reflected from an image being scanned is transmitted to an optical sensor through an optical shutter assembly via a light guide assembly. In exemplary embodiments, such a system would also be capable of functioning as a display assembly yielding a higher fidelity image than is possible using existing liquid crystal displays (LCDs).

SUMMARY OF THE INVENTION

The present invention is directed to an optical image scanning assembly wherein light reflected from an image being scanned is transmitted to an optical sensor through an optical shutter assembly via a light guide assembly. The optical shutter assembly is made substantially opaque except for one or more selected optical shutter elements that are made substantially transparent or opened. Light is then reflected from the medium containing the image to be scanned through substantially transparent shutter element or elements and transmitted to the optical sensor via a light guide assembly. The image may then be scanned by advancing selection of shutter element or elements that are opened across the medium.

In an exemplary embodiment of the present invention, the image scanning assembly is comprised of an optical shutter assembly including a plurality of individually actuateable shutter elements capable of substantially allowing or blocking transmission of light, for example, pulses of light emitted by a light source, onto an object being scanned, wherein at least a portion of the light is reflected from the object through the optical shutter assembly. Light reflected from the object through the open shutter element or elements of the optical shutter assembly is conducted to the optical sensors via a light conducting assembly.

The optical scanning assembly may further be capable of functioning as a display assembly wherein color components for each display element or pixel of the display assembly are premixed so that the display elements provide a true color instead of separate red, green and blue components of that color. In this manner, the display assembly of the present invention is capable of providing a higher fidelity image than is possible using existing display technologies such as LCDs or the like.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an isometric diagrammatic view of an display and optical image scanning assembly in accordance with an exemplary embodiment of the present invention;

FIG. 6 is an isometric diagrammatic view of the light guide assembly an exemplary display and scanning assembly in accordance with the present invention wherein the light guide assembly's color adjustment elements are staggered to increase the density of light conducting columns in the display/scanning area of the assembly.

DETAILED DESCRIPTION OF THE INVENTION

Figure 2A:
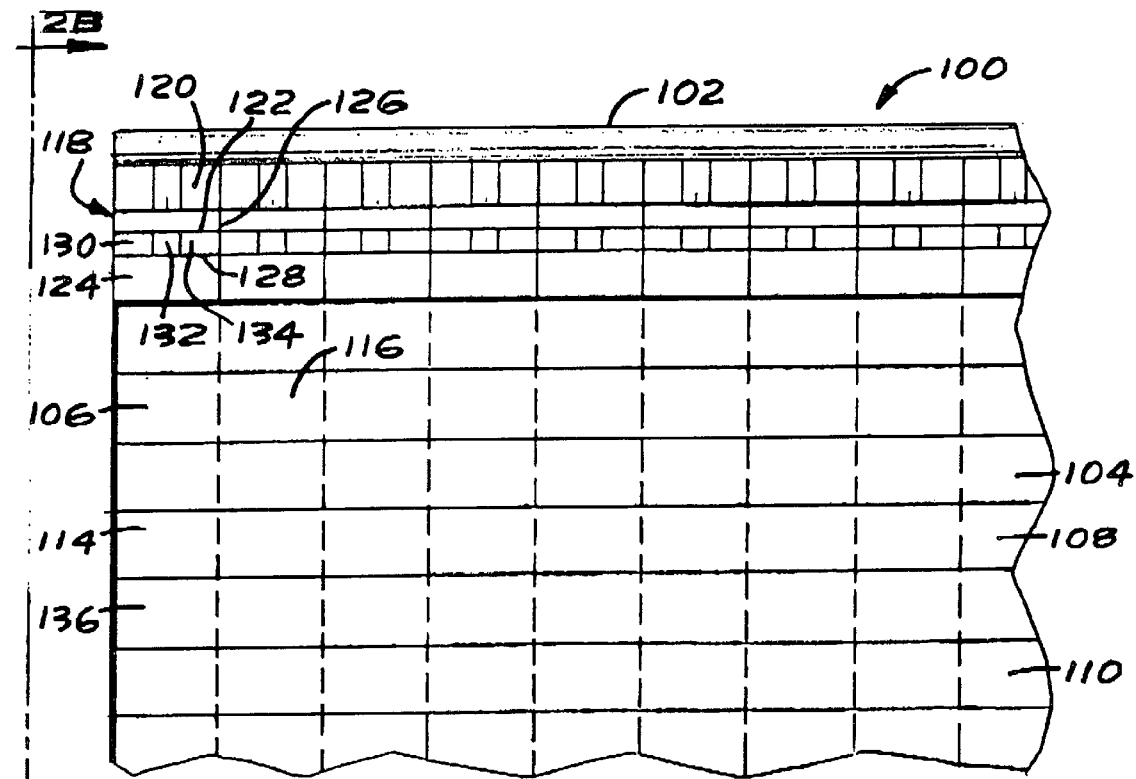
FIGS. 2A and 2B are top plan and side elevational diagrammatic views of the display and scanning assembly shown in FIG. 1.

Reference will now be made in detail to the presently preferred embodiments of the invention, examples of which are illustrated in the accompanying drawings.

Referring generally to FIGS. 1 through 5D, the general structure of a display and optical image scanning assembly in accordance with an exemplary embodiment of the present invention is described. The display and scanning assembly 100, unlike prior optical image scanning devices utilizes no moving parts making the assembly 100 more durable and eliminating mechanical inaccuracy in the scanning function. Further, because there are no mechanical parts to drive, the present display and scanning assembly 100 may draw less power than conventional flat bed scanners. It will be appreciated that while the exemplary embodiment discussed herein is described as being capable of use as both a display and an optical scanner, the present invention is capable of functioning solely as an optical image scanner without providing display functions.

The display and scanning assembly 100 includes a light source 102 coupled to a display/scanning surface 104 having an area 106 suitable for receiving an object to be scanned and/or displaying an image or images to a viewer. The display/scanning surface 104 is comprised of a light guide assembly 108 forming a first or lower layer of the display/scanning surface 104 and an optical shutter assembly 110 forming a second or upper layer of the display/scanning surface 104 within at least the area 106. The light guide assembly 108 is comprised of a plurality of substantially parallel light conducting columns 112 extending along one axis of the display/scanning surface 104. In a like manner, the optical shutter assembly 110 is comprised of a plurality of substantially parallel rows of elongated shutter elements 114 generally disposed over the light conducting columns 112 of light guide assembly 108. Preferably, the shutter elements 114 are arranged along a second axis of the display assembly 100 so as to cross light conducting columns 112 to form a plurality of pixels 116 within display/scanning area 106 wherein each pixel is comprised of the area of apparent intersection of a light conducting column 112 and shutter element 114 as viewed from above the display surface 104.

The light source 102 is preferably capable of emitting high intensity, high frequency pulses of light that are conducted to the optical shutter assembly 110 by the light guide assembly 108 so that light is evenly distributed along across the display/scanning area 106. The light source 102 may be comprised of an elongated light-generating device mounted to one or more edges of the display/scanning surface 104 as shown herein in FIGS. 1 through 5. This arrangement allows the display and scanning assembly 100 to have a narrow thickness similar to that of conventional LCDs and less than that of conventional flat bed scanners. However, it is appreciated that other light source configurations are possible. For example, in exemplary embodiments, the light source 102 may be comprised of a central light generating device mounted behind or adjacent to the display surface 104. Similarly, in the embodiment shown in FIGS. 1 through 4, the shutter elements 114 of optical shutter assembly 110 are oriented so as to be generally perpendicular to the light conducting columns 112 of light guide assembly 108. In this manner, a rectilinear matrix or grid of pixels 116 is formed wherein the pixels 116 are arranged in a plurality of parallel rows and columns. However, it should be appreciated that the present invention is not limited to this orientation. For example, shutter elements 114 may be oriented at a non-right angle to light conducting columns 112 so that a non-rectangular matrix is formed wherein each row of pixels 116 is diagonally offset with its adjacent rows. Substitution of such configurations for the configuration illustrated and discussed herein would not depart from the scope and spirit of the present invention.

Figure 2B:
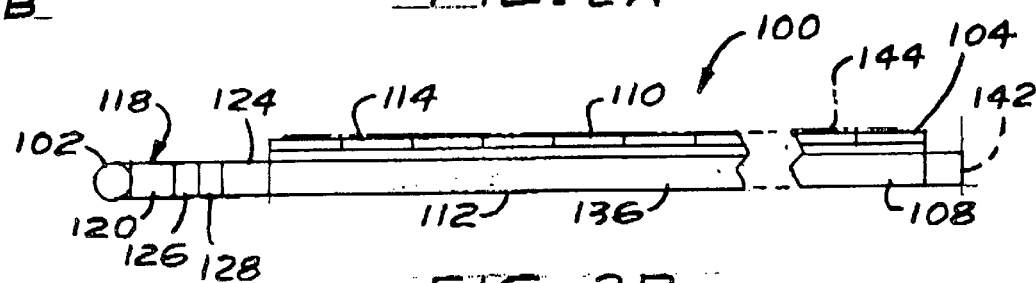

Referring now to FIGS. 1, 2A and 2B, each light conducting column 112 of light guide assembly 108 includes a color adjustment assembly 118 for selecting the color of light to be projected onto an object being scanned when display and scanning assembly 100 is used for scanning. When display and scanning assembly 100 is utilized as a display, the color adjustment assembly may further premix the primary color components of a color of light to be displayed by each pixel 116 within that light conducting column 112. In an exemplary embodiment, the color adjustment assembly 118 includes a red-green-blue (RGB) filter 120, a shutter element 122, and a diffuser 124. The RGB filter 120 separates light from the light source 102 into its red, green and blue components. The shutter element 122 selects the color of light (red, green or blue) to individually illuminate the object to be scanned. Wherein the display and scanning assembly 100 functions as a display, the shutter element 122 also mixes or measures the proper proportions of the red, green and blue light components required to provide the color of light to be displayed by the particular pixel 116 within the light conducting column 112. In exemplary embodiments of the invention, the shutter element 122 is similar in construction to a thin film transistor liquid crystal display (TFT LCD) pixel element utilized in present active matrix LCD displays. In such embodiments, the shutter element 122 is comprised of a polarizing filter or polarizer 126 and a liquid crystal shutter 128 having at least three liquid crystal cells 130, 132 & 134 for selecting either red, green or blue light components for scanning or adjusting the red, blue and green light components of the color to be displayed. The diffuser 124 mixes and randomizes the polarity of the measured red, green and blue light components to produce light having a desired color which is conducted to the pixel 116 by the light conducting column 112. In this manner, wherein the display and scanning assembly 100 functions as a display, the viewer is presented with pixels emitting a true color light instead of separate red, green and blue components provided by sub-pixels. Thus, the viewer's eye does not have to interpret separate red, green and blue sub-pixels to perceive the desired color as in existing color displays such as, for example, conventional LCDs, cathode ray tube (CRT) displays, plasma displays, and light emitting polymer (LEP) displays.

As shown, each light conducting column 112 comprises a light guide or light pipe 136 suitable for conducting or transmitting light along the length of the display/scanning surface 104 with minimal attenuation or loss. The light pipe 136 conducts the light pulses having a predetermined color from the color adjustment assembly 118 to the optical shutter assembly 110. In exemplary embodiments of the invention, the light pipes 136 may be fashioned to direct the transmitted pulses of light to the bottom surface of the optical shutter assembly 110 so that the light may be transmitted through the assembly's shutter elements 114 if opened. For example, the light pipes 136 may include a reflective surface to reflect the transmitted pulse toward the bottom surface of the optical shutter assembly. This surface may be faceted to maximize the amount of light provided to each shutter element 114. Alternately, the light pipes 136 may include a refraction grating or like optical element for refracting the transmitted pulses of light to the bottom surface of the optical shutter assembly 110.

As described above, the optical shutter assembly 110 may be comprised of a plurality of rows of shutter elements 114 oriented to be generally perpendicular to the light conducting columns 112 of light guide assembly 108. In exemplary embodiments of the invention, shutter elements 114 are comprised of individually controlled elongated liquid crystal (LCD) cells. As shown, each LCD cell may run the entire length of a row of the display/scanning area 106 to provide a single isolated shutter. Alternately, a row of the display area 106 may comprise two or more LCD cells. Preferably, the LCD cells may be actuated and de-actuated in response to signals from a controller (not shown). When actuated, the LCD cell becomes substantially transparent allowing transmission of light. Similarly, when de-actuated, the LCD cell becomes opaque substantially blocking transmission of light. In this manner, the LCD cells act as apertures allowing transmission of pulses of light to illuminate one row of pixels 116 within display/scanning area 106. In such embodiments, an example of which is shown in FIGS. 1, 2A and 2B, the optical shutter assembly 108 may further include a polarizing filter layer 140 disposed between the rows of shutter elements 114 and the light guide assembly 108. Preferably this polarizing filter layer 140 encompasses at least the area 106 of display surface 104 to polarize the pulses of light transmitted to the shutter elements 114 via the light guide assembly 108. Preferably, the shutter elements 114 also polarize light so that when activated each shutter element may become opaque to block transmission of the light.

Display/scanning surface 104 may further include light sensing devices such as optical sensors 142 for detecting light reflected through the optical shutter assembly 114 from the object being scanned. For example, as shown in FIGS. 1, 2A and 2B, the light pipe 136 of each light conducting column 118 may be terminated in one or more optical sensors 142 capable of receiving and measuring the amount of light transmitted along that light pipe 136. In exemplary embodiments, the optical sensor may be comprised of one or more charged coupled device (CCD) elements, photo diodes, photo transistors, or like light sensing elements suitable for detecting and measuring reflected light within the light pipe 136. It will be appreciated that in the embodiment shown in FIGS. 1, 2A and 2B, each light conducting column 118 is shown as having a single optical sensor 142. However, it will be appreciated that each light conducting column 118 may alternately include two or more optical sensors 142 per column 118. In this manner, the present invention may provide increased scanning resolution or may use separate optical sensors for sensing different colors of light. For example, separate optical sensors 142 may be provided for sensing red, blue and green light reflected from the object being scanned so that a color image of the object may be produced. Similarly, it should also be appreciated that only selected ones of the columns 118 may include optical sensors 142. In this manner, the density of columns 118 within the display and scanning assembly 100 may be increased as discussed in the description of FIG. 5 to provide greater resolution when the assembly 100 is used as a display, while the number of optical sensors 142 is not increased beyond that required to provide sufficient scanning resolution.

In the exemplary embodiment shown, scanning of an object such as a document 144 or the like is accomplished by actuating or opening shutter elements 114 in a predetermined sequence so as to sequentially pass pulses of light transmitted to the optical shutter assembly 110 via the light guide assembly 108 through a pixel or group of pixels 116, whereupon the light is directed onto a selected area of the object being scanned (for example, document 144). The pulses of light are reflected by the object being scanned wherein the reflected light is passed back through one or more pixels 116 of the optical shutter assembly and transmitted to optical sensors 142 via the light guide assembly 136 whereupon the amount of absorption and reflection of light from the surface of the object though each pixel or group of pixels 116 is measured by measuring the amplitude of light received by each optical sensor 142. The amplitude of light measured at each pixel or group of pixels is then translated into a digital signal that can be manipulated by suitable optical character recognition (OCR) software or graphics software utilizing a computer or other information appliance. Preferably, the actuation or opening of shutter elements 114 & 122 is synchronized with the emission of a pulse of light by light source 102 to optimize efficiency of the display/scanning assembly 100 and to prevent noise due to emission of pulses of light during transition of the shutter elements 114.

Wherein a color image of the object is desired, the color adjustment assembly 118 may adjust the color of the emitted pulses of light transmitted by each light conducting column 112 each time a new shutter element is actuated. For example, the color adjustment assembly 118 may cause pulses of light having the colors of primary red, blue and green to be alternately transmitted to each pixel or group of pixels 116 of the display/scanning surface 104 in turn. The amount of absorption and reflection of the primary colored (red, green and blue) pulses of light from the surface of the object though each pixel or group of pixels 116 is measured and used to determine the color of the surface of the object adjacent to that pixel or group of pixels 116. By using multiple scans of the object's surface wherein each scan utilizes light of a different primary color, an image having the true colors of the surface of the object may be generated using inexpensive light sensors limited to light amplitude sensing.

The display and scanning assembly 100 may be capable of detecting and compensating for ambient light conditions to increase the accuracy the colors within the image generated. For example, in an exemplary embodiment, white light (light containing equal amounts of all red, green and blue components) may be utilized in an initial scan to define the ambient conditions in which the display and scanning assembly 100 is used. The assembly 100 may then be made to compensate for these conditions, for example, by adjusting the color of red, green and blue light emitted during the scanning process. Alternately, post-scanning processing may be employed to adjust the scanned image. The display and scanning assembly 100 may further use such an initial white light scan to detect the boundaries of the object being scanned so that color scanning may be limited to the area of the object to increase the assembly's efficiency.

Figure 3A:
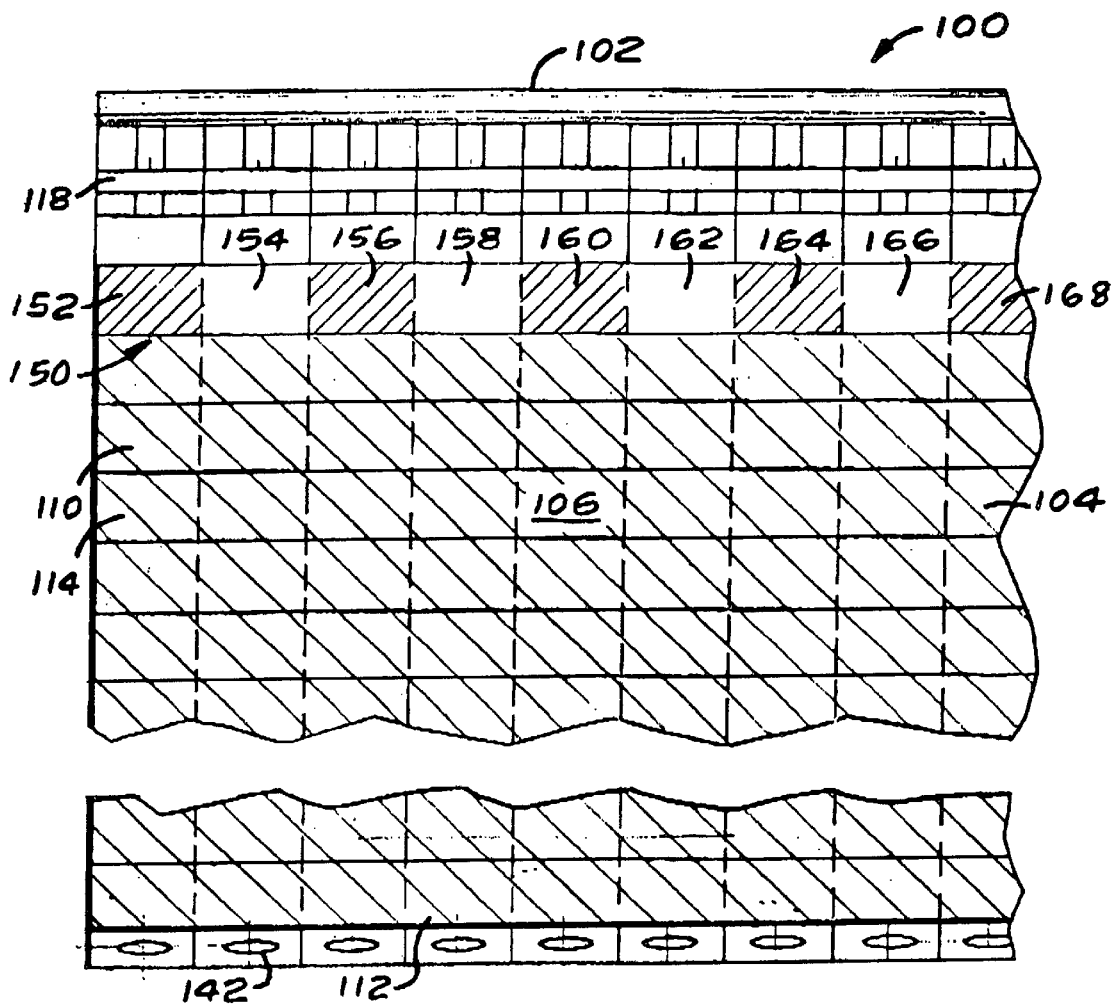
FIGS. 3A, 3B, 3C, 3D, 3E, and 3F are top plan and end elevational diagrammatic views of the display and scanning assembly shown in FIG. 1, illustrating a first method of scanning an object.
Figure 3B:
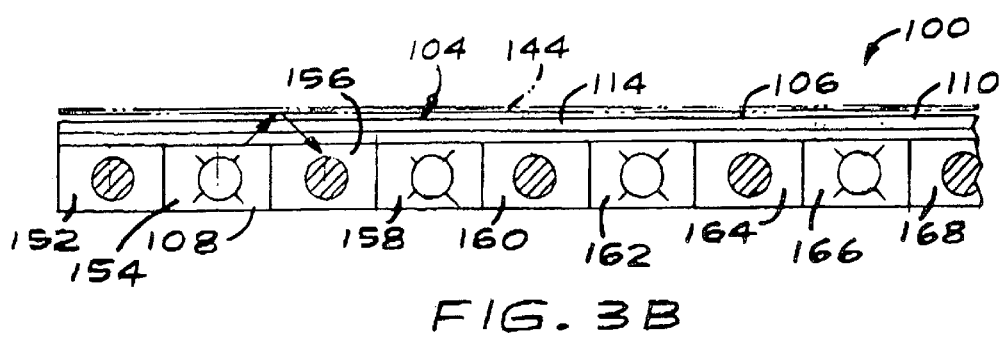
Figure 3C:
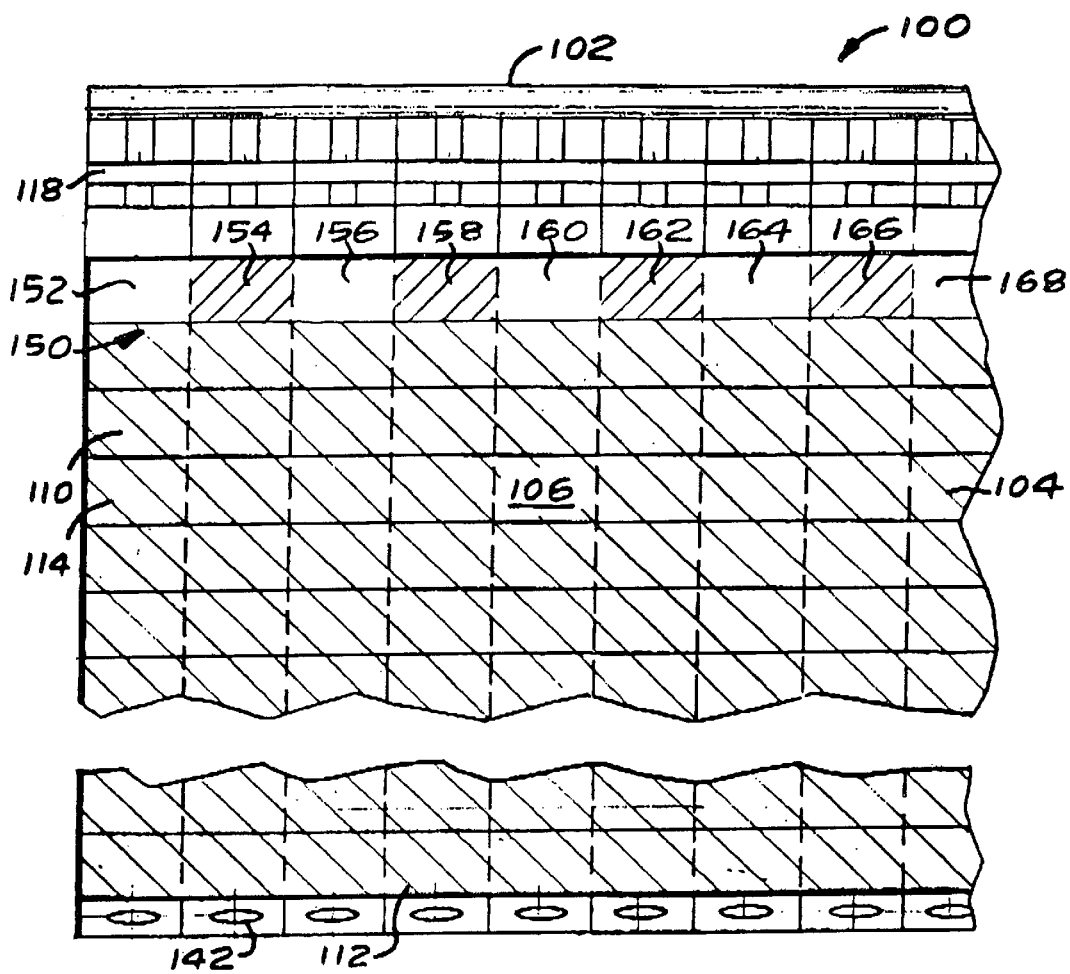
Figure 3D:
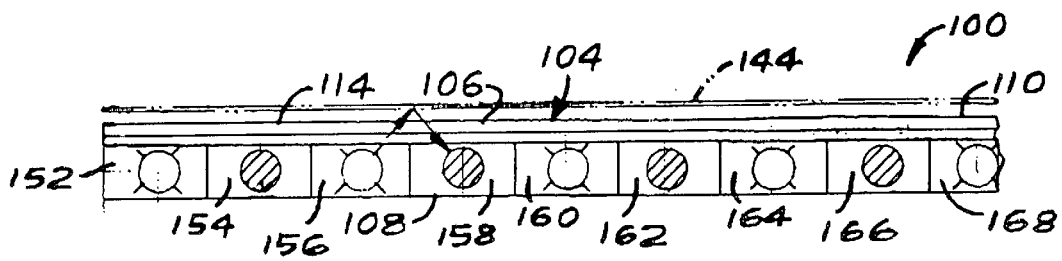
Figure 3E:
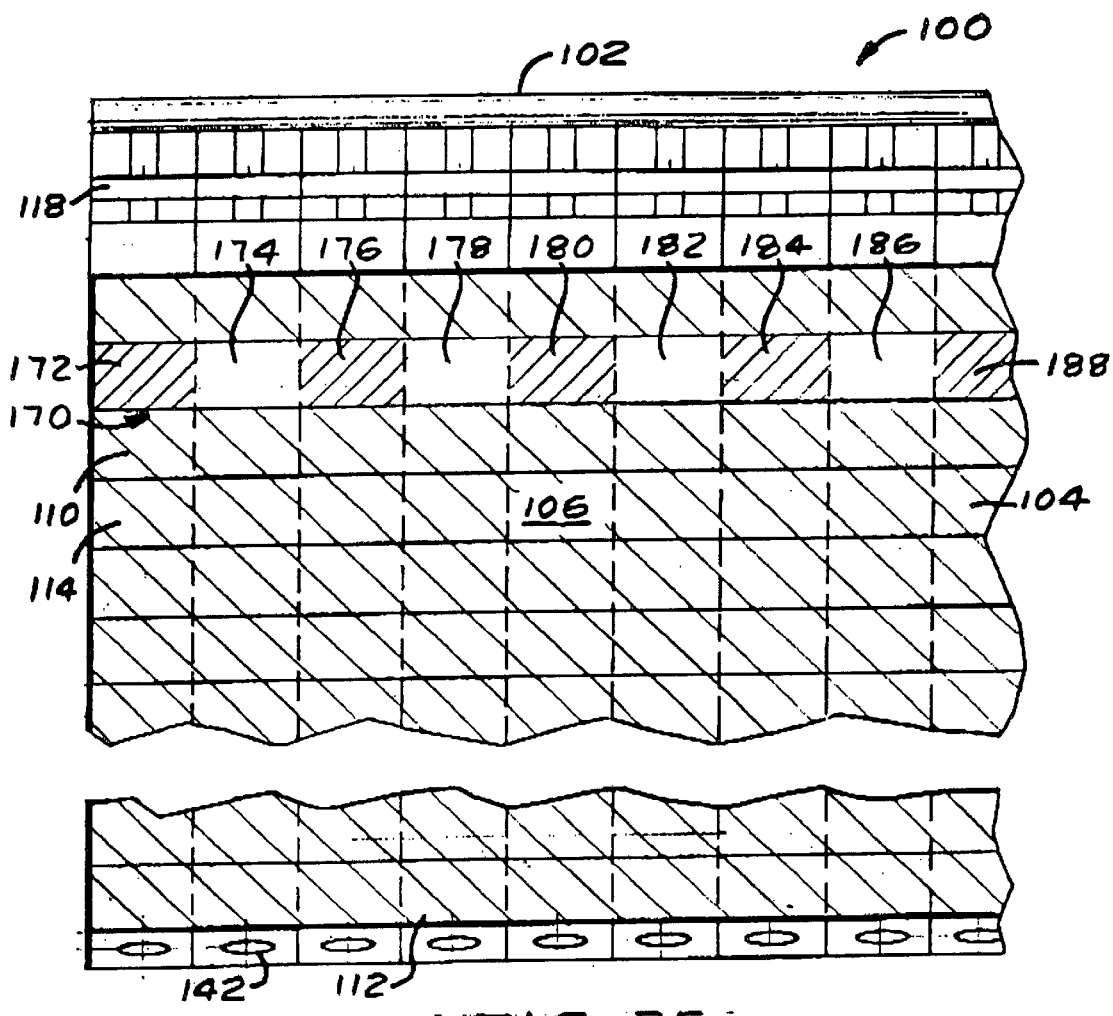
Figure 3F:
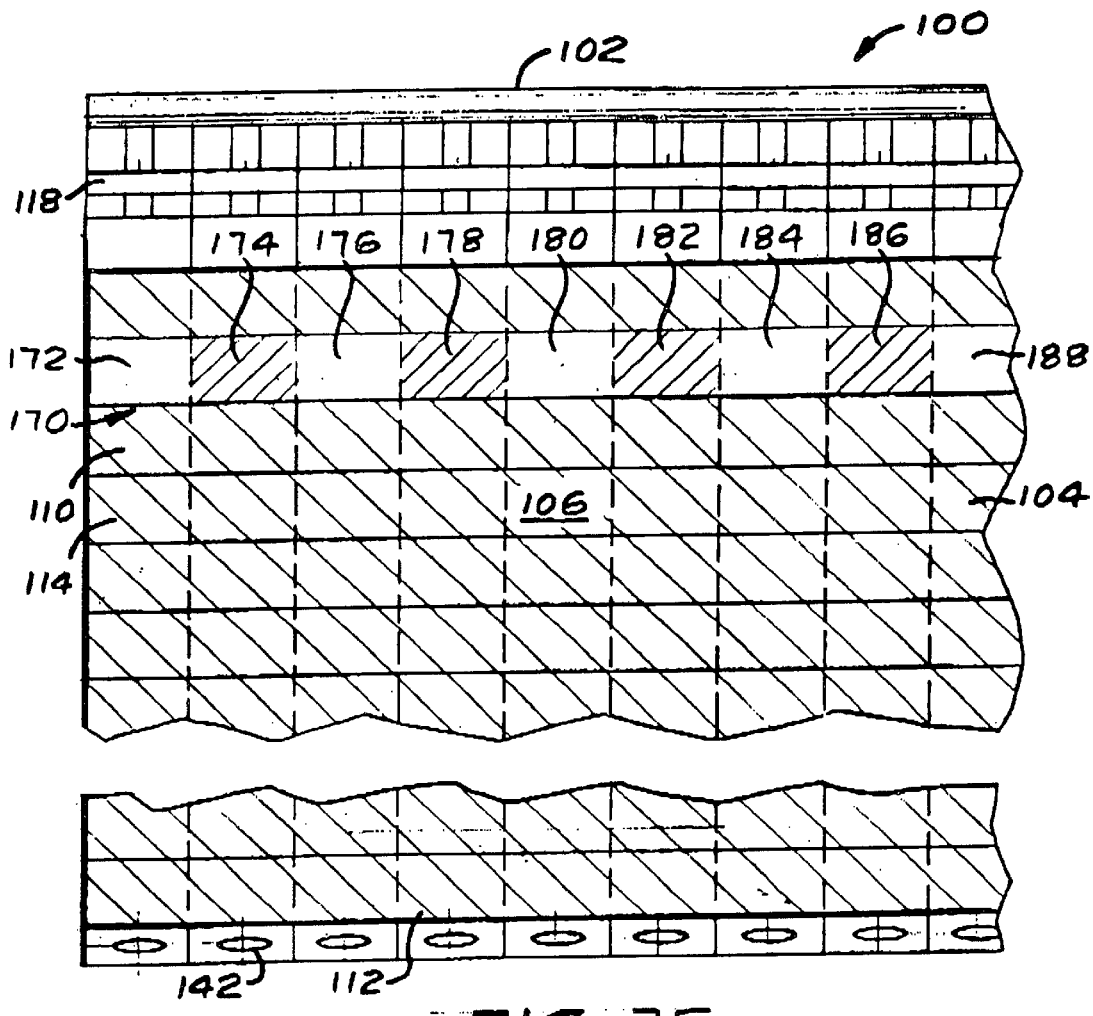

In embodiments of the invention, the surface of object 144 may be scanned by illuminating some of the light conducting columns 112 along each row of the display/scanning surface 104 and sensing the amplitude of light reflected along the non-illuminated columns 112. For instance, in the exemplary embodiment shown in FIGS. 3A through 3F, every other column 112 (odd or even) may be illuminated while the alternate (even or odd) non-illuminated columns 112 are sensed. In this embodiment, scanning of the surface of an object 144 would be accomplished by using two scanning "passes" per each row of the display/scanning assembly 104 for each color scanned. For example, as shown in FIGS. 3A and 3B, the shutters 128 of every other column 112 may be opened to emit light having the desired color (for example, primary red, green, or blue) along the columns 112 corresponding to those shutters 128. As previously discussed, the shutter 128 may also adjust the tint of the primary color transmitted to compensate for ambient light conditions. One row of display scanning surface 104 is left while all others are made opaque by the optical shutter assembly 110 transparent (one optical shutter element 150 is opened). The emitted light is conducted to the opened shutter element 150 of optical shutter assembly 110 by light pipes 136 where it is allowed to strike the surface of object 144 through every other pixel in that row (for example, through pixels 152, 156, 160, 164 & 168). The shutters 128 of the remaining columns 112 are closed so that the optical sensors 142 within these columns may sense light reflected from the object 144 being scanned through pixels 154, 158, 162 & 166. The amplitude of light reflected by the surface of the object adjacent to pixels 154, 158, 162 & 166 is in this manner measured and stored. Next, as shown in FIGS. 3C and 3D, the shutters 128 of the light conducting columns 112 corresponding to corresponding to pixels 152, 156, 160, 164 & 168 are again closed and the shutters 128 of light conducting columns 112 corresponding to the previously non-illuminated pixels (pixels 154, 158, 162 & 166) are opened. A second pulse of light is emitted by light source 102 and adjusted to the desired color (for example, primary red, green, or blue) as described above is conducted to the optical shutter assembly 110 via light conducting columns 112 corresponding to the opened shutters 128 where it is directed onto the surface of the object 144 through pixels 154, 158, 162 & 166. The optical sensors 142 within the light conducting columns 112 corresponding to pixels 152, 156, 160, 164 & 168 are then activated to sense light reflected from the object 144 being scanned through pixels 152, 156, 160, 164 & 168. The amplitude of light reflected by the surface of the object adjacent to pixels 152, 156, 160, 164 & 168 is in this manner also measured and stored. This process is repeated for pixels 116 within each shutter element 114 of optical shutter assembly 110 for each primary color of light (red, blue, and green). The light reflection information for each pixel 116 of the display/scanning surface 104 is then assembled to generate an image of the surface of the object 144 being scanned. True color is provided by combining the light absorption and reflection information for each primary color at each pixel to reproduce the actual color of the surface of the object 144 adjacent to that pixel 116.

Figure 4A:
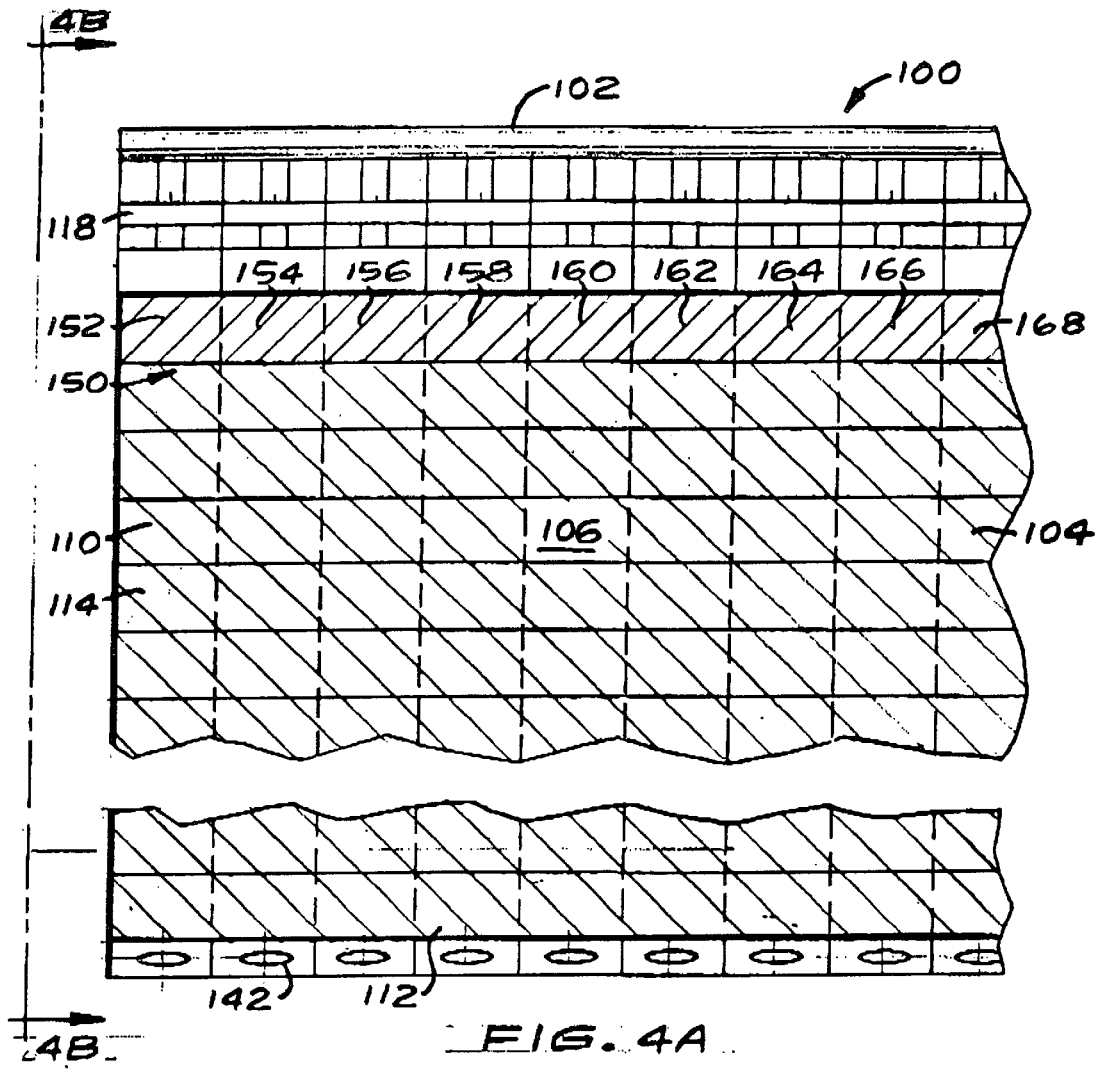
FIGS. 4A, 4B, 4C and 4D are top plan and side elevational diagrammatic views of the display and scanning assembly shown in FIG. 1, illustrating a second method of scanning an object.
Figure 4B:
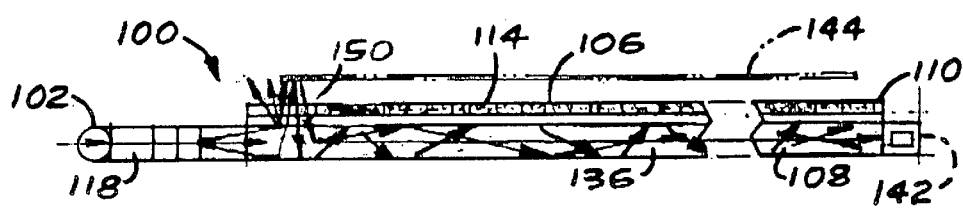
Figure 4C:
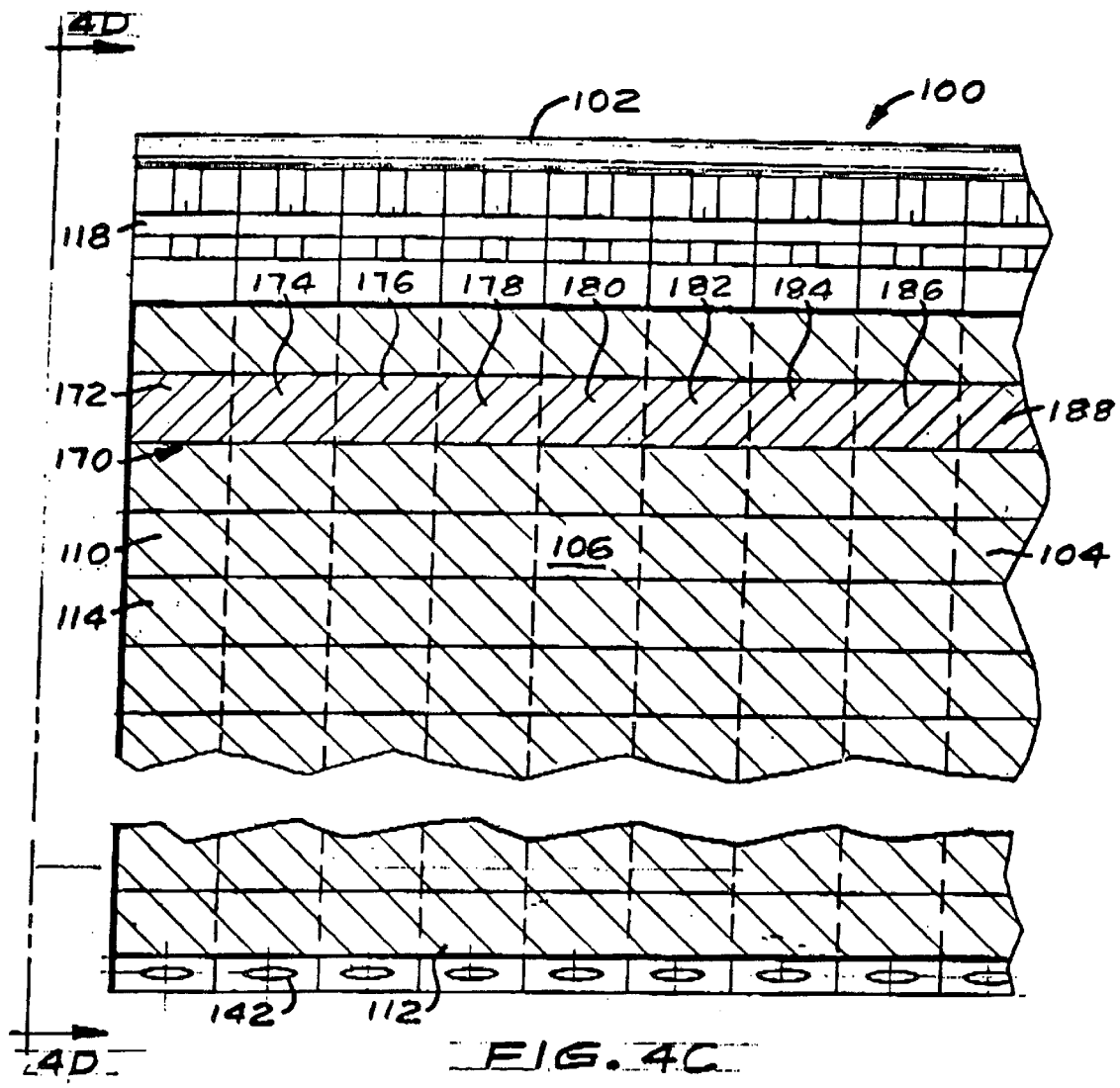
Figure 4D:
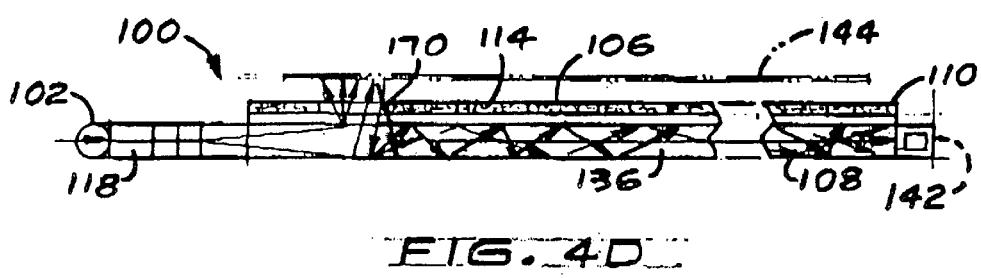

In an alternate embodiment, shown in FIGS. 4A through 4D, the surface of object 144 may be scanned by illuminating each row 150, 170 of pixels 152–168, 172–188 within the display/scanning surface 104 and sensing the absorption of light along each column 112. In FIGS. 4A and 4B, a first row 150 of display elements or pixels 152–168 is shown illuminated. A pulse of light is provided to each light conducting column 112 of light guide assembly 108 by light source 102. The light pulse is separated into its red, green and blue component parts by RGB filter 120 and polarized by polarizing filter 126. The shutter 128 selects the primary color component of light (red, green or blue) that is to be transmitted by the light pipe 136 to the pixels 152–168 in the row 150 being illuminated. As previously discussed, the shutter 128 may also adjust the tint of the primary color transmitted to compensate for ambient light conditions. The pulse of light is then mixed and randomized by diffuser 124. Next, the shutter element 114 corresponding to the row of pixels 150 being illuminated is opened allowing the pulse of light to be transmitted though the optical shutter assembly 110 where it is reflected off of the surface of the object 144 being scanned. Preferably, at least a portion of the light directed onto the surface of the object 144 is reflected through the shutter assembly 110 where it is conducted to optical sensors 142 by light pipes 136. As shown in FIGS. 4C and 4D, once the first pulse of light has been transmitted, the shutter element 114 corresponding to the first row of pixels 150 is de-actuated or closed. A second pulse of light is then provided to each light conducting column 112 of light guide assembly 108 by light source 102. This light pulse's color is similarly adjusted to provide the desired color of light (for example, primary red, green or blue) for illuminating the pixels 172–188 in the next row 170 being scanned, and transmitted the optical shutter assembly 110 by light pipe 136. The next shutter element 114 corresponding to the row of pixels 170 being illuminated is opened allowing the pulse of light to be transmitted though the optical shutter assembly 110 where it is reflected off of the surface of the object 144 being scanned. Again, at least a portion of the light directed onto the surface of the object 144 is reflected through the shutter assembly 110 where it is conducted to optical sensors 142 by light pipes 136. This process is repeated for each shutter element 114 of optical shutter assembly 110 for each primary color of light (red, blue, or green). The light absorption information for each pixel 116 of the display/scanning surface 104 is then assembled to generate an image of the surface of the object 144 being scanned. As in the previous embodiment, true color is provided by combining the light absorption and reflection information for each primary color at each pixel to reproduce the actual color of the surface of the object 144 adjacent to that pixel 116.

In the exemplary embodiment shown in FIGS. 1, 2A, 2B, and 5A through 5D, display of an image by the display and scanning assembly 100 of the present invention is accomplished by actuating or opening shutter elements 114 in a predetermined sequence so as to sequentially illuminate rows of pixels 116 utilizing pulses of light transmitted to the optical shutter assembly 110 via the light guide assembly 108. The color adjustment assembly 118 adjusts the color of the emitted pulses of light transmitted by each light conducting column 112 each time a new shutter element is actuated so that the color of light to be emitted by each pixel 116 within the row defined by that shutter element 114 is premixed. This sequential actuation or "rastering" of shutter elements 114 is accomplished at a rate sufficient for the viewer's natural persistence of vision to cause the viewer to perceive that all of the pixels 116 within the display area 106 are illuminated at once thereby allowing the viewer to interpret the displayed image. Thus, unlike present LCDs which control output via individual circuits for each pixel, the display and scanning assembly 100 of the present invention employs sequencing of light output and shutter similar to a film projector projecting a motion picture.

Preferably, the actuation or opening of each shutter element 114 is synchronized with the emission of a pulse of light by light source 102 to optimize efficiency of the display (brightness and clarity) and to prevent noise (for example, dimly illuminated rows of pixels) due to emission of pulses of light during transition of the shutter elements 114. Further, because only one row of pixels 116 is activated at a time, the light source preferably provides a sufficiently high intensity pulse of light to induce persistence of vision in the viewer allowing the viewer to, in effect, continue to see the pixels of each row while other rows of pixels are sequentially illuminated.

Figure 5A:
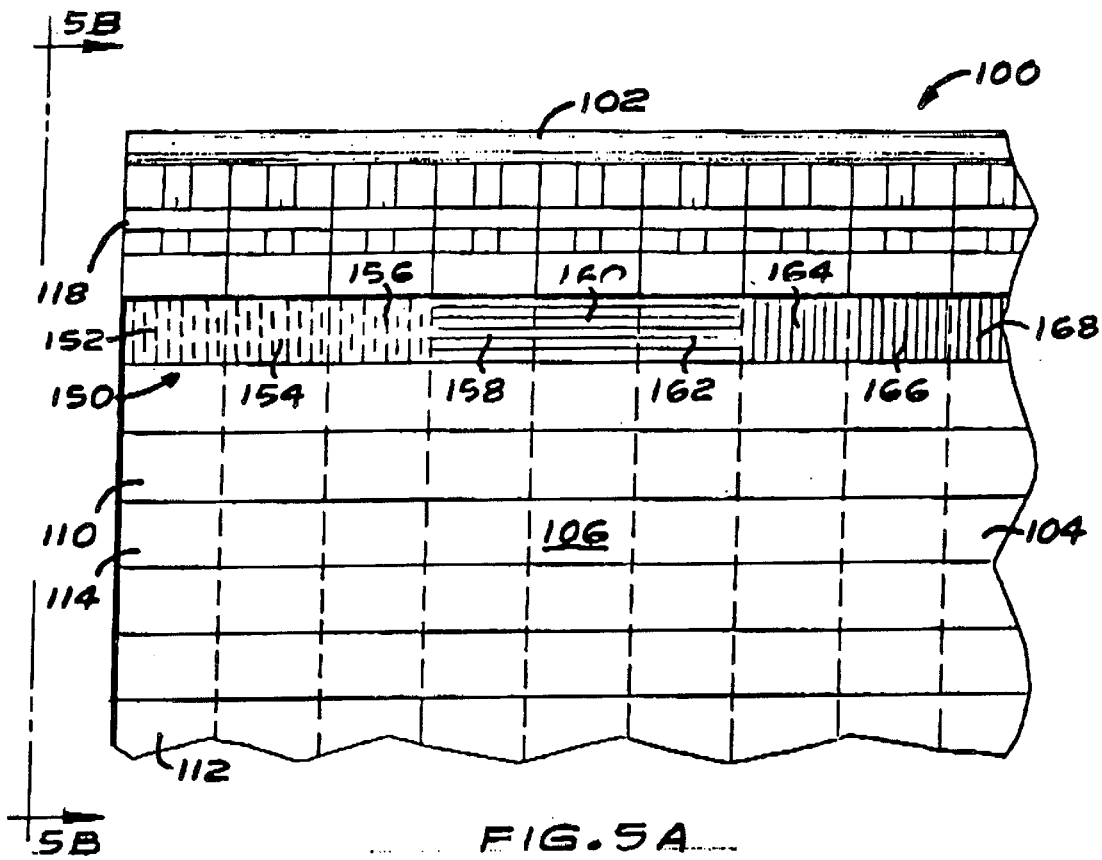
FIGS. 5A, 5B, 5C and 5D are top plan and side elevational diagrammatic views of the display and scanning assembly shown in FIG. 1, illustrating a method by which an image may be displayed by the assembly.
Figure 5B:
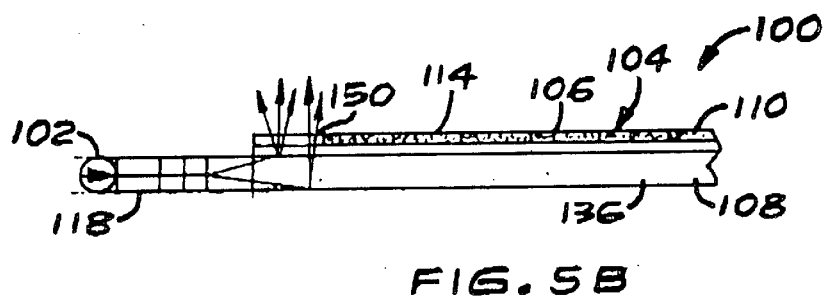
Figure 5C:
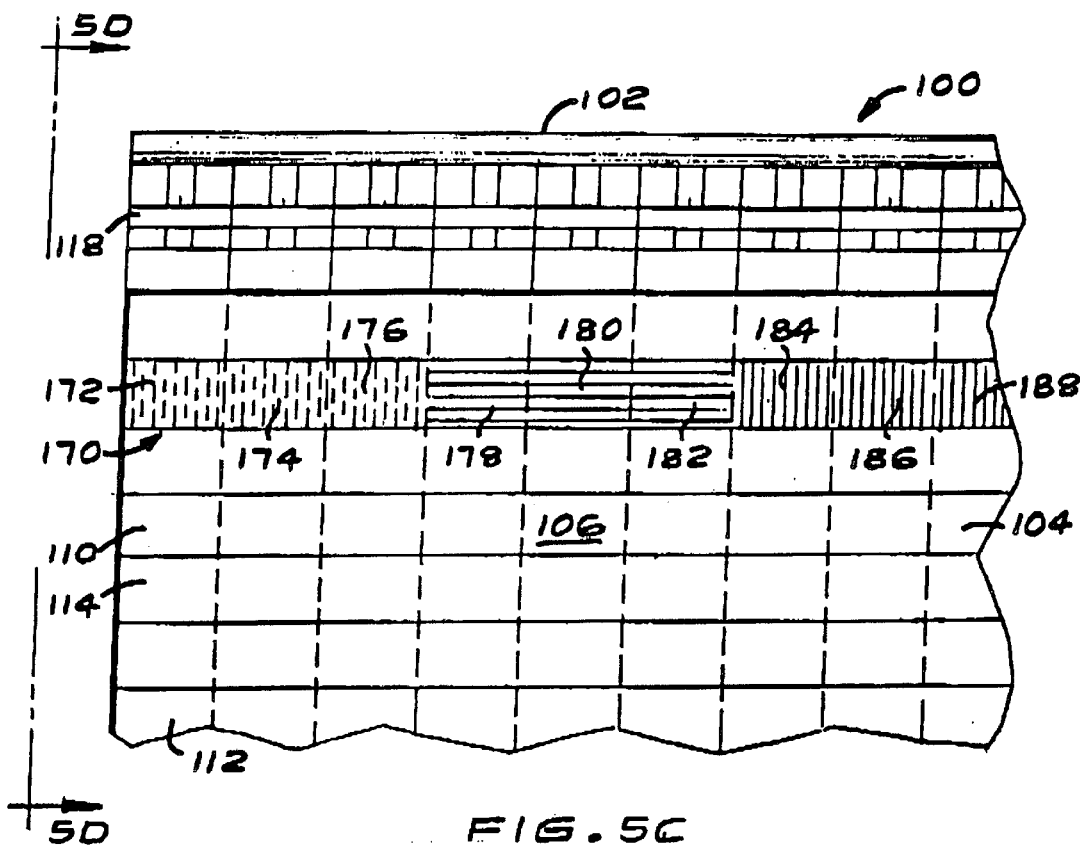
Figure 5D:
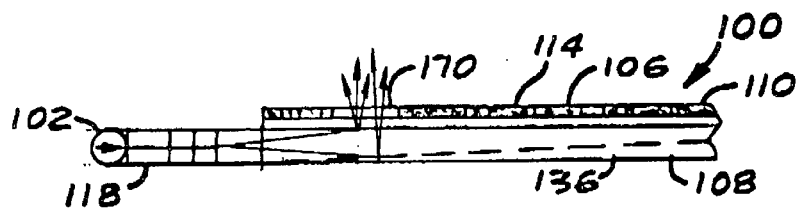

In FIGS. 5A and 5B, a first row 150 of pixels 152–168 is shown illuminated. A pulse of light is provided to each light conducting column 112 of light guide assembly 108 by light source 102. The light pulse is separated into its red, green and blue component parts by RGB filter 120 and polarized by polarizing filter 126. The shutter 128 adjusts the proper proportions of the red, green and blue light components required to provide the color of light to be displayed by the particular pixels 152–168 in the row being illuminated. The color components are then mixed and randomized by diffuser 124 and the colored light pulse transmitted to the optical shutter assembly 110 by light pipe 136. Next, the shutter element 114 corresponding to the row of pixels 150 being illuminated is opened allowing the pulse of light having a premixed color for each pixel 152–168 to be transmitted though the optical shutter assembly 110. As shown in FIGS. 5C and 5D, once the first pulse of light has been transmitted, the shutter element 114 corresponding to the first row of pixels 150 is de-actuated or closed. A second pulse of light is then provided to each light conducting column 112 of light guide assembly 108 by light source 102. This light pulse's color is similarly adjusted or premixed to provide the color of light to be displayed by the particular pixels 172–188 in the next row 170 being illuminated, and transmitted the optical shutter assembly 110 by light pipe 136. The next shutter element 114 corresponding to the row of pixels 170 being illuminated is opened allowing the pulse of light having a premixed color for each pixel 172–188 to be transmitted though the optical shutter assembly 110. This process is continuously repeated for each row of pixels within the display area 106 at a rate sufficient for the viewer's natural persistence of vision to cause the viewer to perceive that all of the pixels 116 within the display area 106 are illuminated at once thereby allowing the viewer to interpret the displayed image.

Signaling within the present assembly 100 when functioning as a display is preferably similar to that employed by other flat panel displays. However, instead of using a two-axis method of scanning, the present invention would refresh an entire row or axis and repeat. Thus, unlike present signal decoding for active matrix LCDs which require mapping of the entire display area, the present invention only requires a map of a single row at one time, and a simple sequencing of shutter elements 114.

As shown in FIGS. 1 through 5D, the present invention, used as a display, typically uses fewer components than a comparable color active matrix LCD. For example, as discussed above, a color active matrix LCD having a 1600× 1200 display (1600 columns by 1200 rows of pixels) would have over 5.76 million elements. A display assembly 100 in accordance with the present invention having a 1600×1200 display would utilize only 6000 elements (1600 rows×3 liquid crystal cells 130, 132 & 134 per row×1200 shutter elements 114). Additionally, control circuitry for the present display assembly 100 is placed along the edges of the display surface 104 within the color adjustment assemblies 118 and not within each individual pixel 116 of the display surface 104, thereby reducing the amount of control circuitry required. This reduction in the amount of control circuitry and placement of the control circuitry outside of the display area 106 simplifies manufacture of the display assembly 100, increasing yields and reducing manufacturing costs while allowing additional options in materials from which the display assembly may be manufactured (for example, plastics and the like). Further, by decreasing the amount of control circuitry and by placing the control circuitry along the edges of the display surface 104 where it may be covered and protected, the display assembly 100 is made more durable since the circuitry is less likely to be damaged due to flexure of the display surface 104. Still further, because the amount of control circuitry, which is heat bearing, is greatly reduced, the display assembly 100 may be sealed to provide resistance to environmental contamination thereby providing increased reliability, durability and longevity. Finally, due to the reduction and isolated concentration of the control circuitry, electromagnetic interference (EMI) is also reduced compared to conventional active matrix LCDs.

Active matrix LCDs are limited in that the size of their pixels cannot be reduced beyond the area occupied by the pixel's control circuitry (TFT). The present invention allows for the provision of smaller pixels than active matrix LCDs since the control circuitry is placed along the edges of the display and not within each individual pixel of the display/ scanning area. Further, in the present invention, staggering or other mechanical arrangements may likewise be utilized to increase the density of columns within the display and scanning assembly thereby increasing the density of pixels, providing greater scanning resolution when used as a scanner and a higher fidelity image when used as a display. For example, in FIG. 6, the light guide assembly of an exemplary display and scanning assembly 200 is shown having staggered groups 202 & 204 of color adjustment assemblies 206. These color adjustment assemblies 206 each select or premix the color of light transmitted by a light conducting column 208 within display/scanning surface 210 as discussed above in the description of FIGS. 1 through 5D. However, as shown in FIG. 6, each group of color adjustment assemblies 206 may be staggered transversely, longitudinally, and/or vertically within the display and scanning assembly 200 allowing the width of light pipes 212 to be reduced. In this manner, the density of light conducting columns 208 in the display and scanning assembly 200 may be increased.

The present invention may be utilized in a wide range of scanning applications including flatbed scanners, photocopiers, facsimile machines, devices for scanning and verifying the authenticity of paper currency, and the like. Because the present invention is capable of functioning both as an optical image scanning device and a display, the present invention may be utilized to provide devices which commonly utilize display monitors, such as computer systems or the like with a optical image scanning capability that is integrated within the devices monitor. In such applications, an object such as a document or the like to be scanned may be held against the display surface of such a monitor to be scanned. A cover assembly may be utilized to enclose the object for reducing noise caused by ambient light impinging the scanning surface. Such a cover assembly may also function to hold the object in place.

Figure 7:
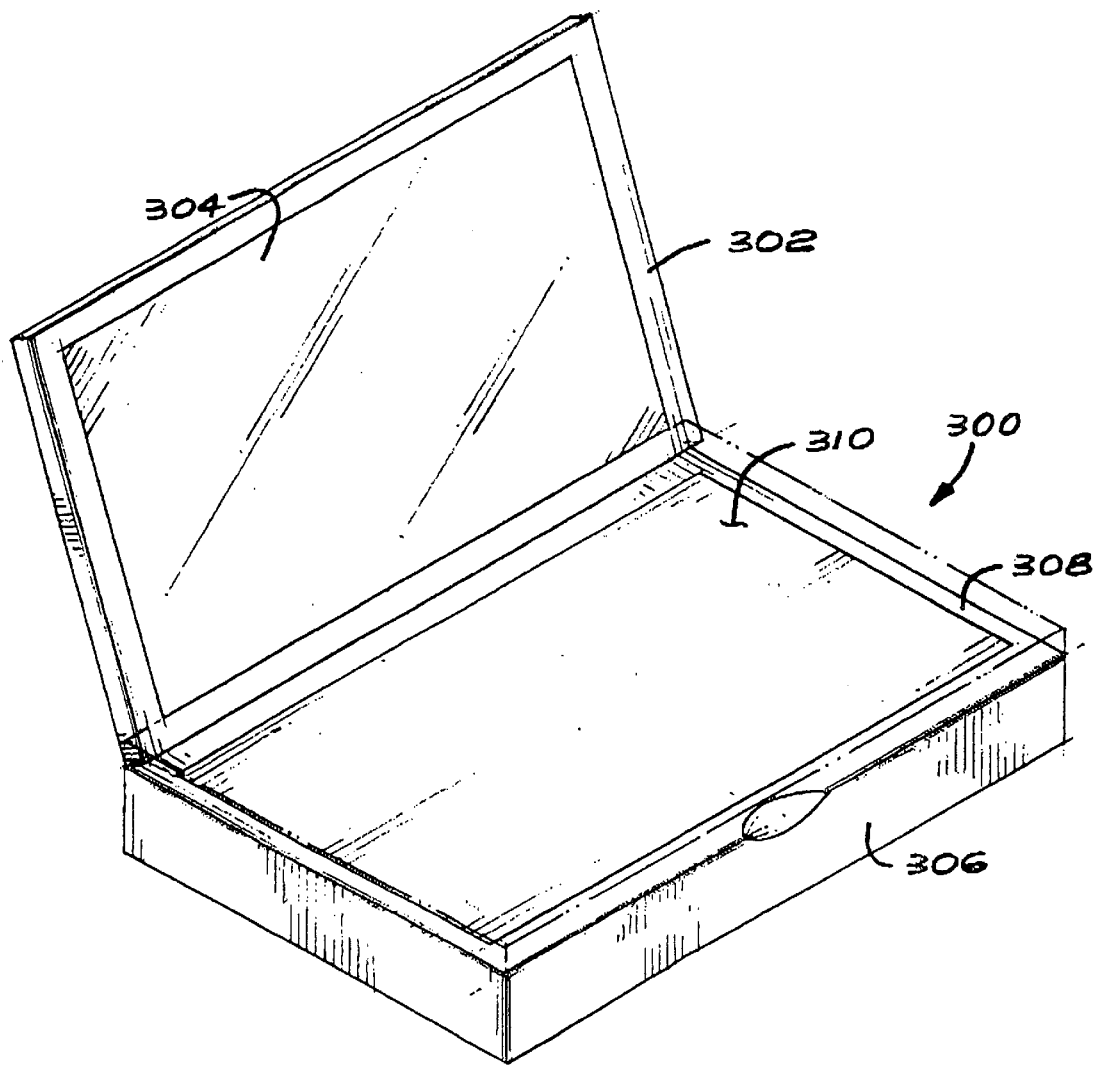
FIG. 7 is an isometric view of a portable computer system illustrating one possible method of utilizing the integrated display and image scanning assembly of the present invention to scan an object such as a document.

In such an exemplary embodiment, as shown in FIG. 7, a portable computer 300 such as a laptop or notebook computer, may include a lid portion 302 having a display and scanning assembly 304 in accordance with the present invention integrated therein so that it may function as the computer's display. The lid portion 302 is hinged to a main housing portion 306 having a keyboard surface 308.

Preferably, the main housing portion 306 and lid portion 302 may be folded together so that the computer system 300 may be easily carried by a user. In accordance with an exemplary embodiment of the present invention, the portable computer may function as an optical image scanner by placing the object to be scanned 310 onto the keyboard surface 308 and closing the lid portion 302 against the main housing portion 806 thereby bringing the display and scanning assembly 304 adjacent to the object. The object 310 may then be scanned in the manner described in the discussion of FIGS. 3A through 3D or 4A through 4D. The scanned image may then be stored in memory. In an exemplary embodiment, the scanned image may, for example, be initially stored in the computer's internal video memory. In such an embodiment, the scanned image to be displayed to the computer's user by the display and scanning assembly 804 when the lid portion 802 is lifted from the closed position adjacent to the object to an open position suitable for viewing.

It is believed that the display and scanning assembly of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An image scanning assembly capable of scanning an image of an object, comprising:
    an optical shutter assembly including a plurality of individually actuateable shutter elements capable of substantially allowing or blocking transmission of light onto the object wherein at least a portion of the light is reflected from the object through said optical shutter assembly;
    an optical sensor suitable for sensing light reflected from the object through said optical shutter assembly;
    a light conducting assembly suitable for conducting light to said optical shutter assembly and for conducting light reflected from the object to said optical sensor;
    wherein selected ones of said plurality of shutter elements are actuated in a predetermined sequence for allowing transmission of light for illuminating the object whereupon light reflected from the object is sensed by said plurality of light sensing elements.

2. The image scanning assembly as claimed in claim 1, further comprising a light source suitable for emitting light for illuminating the object.

3. The image scanning assembly as claimed in claim 2, wherein said light source comprises a strobe light source capable of generating high intensity pulses of light.

4. The image scanning assembly as claimed in claim 1, further comprising a light conducting assembly suitable for conducting light to said optical shutter assembly and for conducting light reflected from the object to said optical sensor.

5. The image scanning assembly as claimed in claim 4, wherein said light conducting assembly comprises a plurality of light conducting columns suitable for conducting light along an axis of the image scanning assembly, each of said plurality of light conducting columns including a color adjustment assembly for adjusting the color of said pulses of light conducted by said light conducting column.

6. The image scanning assembly as claimed in claim 5, wherein each of said plurality of light conducting columns including a color filter for filtering pulses of light emitted by said light source into at least one color and a shutter element for selecting the color of said pulses of light conducted by said conducting columns.

7. The image scanning assembly as claimed in claim 6, wherein each of said color filter elements comprises red, blue, and green filters for providing the red, blue and green light.

8. The image scanning assembly as claimed in claim 7, wherein said shutter element comprises a liquid crystal shutter elements suitable for adjusting the proportion of light passing through said red, green and blue filters.

9. The image scanning assembly as claimed in claim 6, wherein each of said light conducting columns further comprises a diffuser for diffusing, randomizing and mixing light passing through said shutter element.

10. The image scanning assembly as claimed in claim 6, wherein each of said light conducting columns further comprises a polarizer.

11. The image scanning assembly as claimed in claim 6, further comprising a polarizing layer disposed between said plurality of light conducting columns and said plurality of shutter rows.

12. The image scanning assembly as claimed in claim 1, wherein each of said plurality of shutter elements of said shutter assembly comprises an elongated liquid crystal shutter row.

13. An image scanning assembly for scanning an image of an object, comprising:
    a light source suitable for emitting light for illuminating the object;
    an optical shutter assembly including a plurality of individually actuateable shutter elements capable of substantially allowing or blocking transmission light emitted from said light source so that the light is directed onto the object wherein at least a portion of the light is reflected from the object through said optical shutter assembly;
    an optical sensor capable of sensing light reflected from the object through said optical shutter assembly;
    a light conducting assembly suitable for conducting light from said light source to said optical shutter assembly and for conducting light reflected from the object to said optical sensor;
    wherein selected ones of said plurality of shutter elements are actuated in a predetermined sequence for allowing transmission of light conducted from said light source via said light conducting assembly for illuminating the object whereupon light reflected from the object is sensed by said plurality of light sensing elements.

14. The image scanning assembly as claimed in claim 13, wherein said light conducting assembly comprises a plurality of light conducting columns suitable for conducting light along an axis of the image scanning assembly, each of said plurality of light conducting columns including a color adjustment assembly for adjusting the color of said pulses of light conducted by said light conducting column.

15. The image scanning assembly as claimed in claim 14, wherein each of said plurality of light conducting columns including a color filter for filtering pulses of light emitted by said light source into at least one color and a shutter element for selecting the color of said pulses of light conducted by said conducting columns.

16. The image scanning assembly as claimed in claim 15, wherein each of said color filter elements comprises red, blue, and green filters for providing the red, blue and green light.

17. The image scanning assembly as claimed in claim 16, wherein said shutter element comprises a liquid crystal shutter elements suitable for adjusting the proportion of light passing through said red, green and blue filters.

18. The image scanning assembly as claimed in claim 15, wherein each of said light conducting columns further comprise a polarizer.

19. The image scanning assembly as claimed in claim 15, wherein each of said light conducting columns further comprises a diffuser for diffusing, randomizing and mixing light passing through shutter element.

20. The image scanning assembly as claimed in claim 15, further comprising a polarizing layer disposed between said plurality of light conducting columns and said plurality of shutter rows.

21. The image scanning assembly as claimed in claim 13, wherein each of said plurality of shutter elements of said shutter assembly comprises an elongated liquid crystal shutter row.

22. An image scanning assembly capable of scanning an image of an object, comprising:
   a light source suitable for emitting pulses of light;
   a plurality of light conducting columns suitable for conducting said pulses of light received from said light source along an axis of the image scanning assembly; and
   a plurality of shutter rows oriented generally perpendicular to said light conducting columns to form a plurality of display elements, said shutter rows being capable of substantially allowing or blocking transmission of said pulses of light conducted from said light source via said plurality of light conducting columns so that said pulses of light are directed onto the object;
   a plurality of light sensing elements, each of said plurality of light sensing elements capable of sensing light reflected from the object through said plurality of shutter rows via said light conducting columns;
   wherein selected ones of said plurality of shutter rows are actuated in synchronization with said pulses of light emitted from said light source allowing transmission of said pulses of light through said selected ones of said plurality of shutter rows for illuminating the object whereupon light reflected from the object is sensed by said plurality of light sensing elements.

23. The image scanning assembly as claimed in claim 22, wherein each of said plurality of light conducting columns includes a color adjustment assembly for adjusting the color of said pulses of light conducted by said light conducting column.

24. The image scanning assembly as claimed in claim 23, wherein each of said plurality of said color adjustment assembly includes a color filter for filtering pulses of light emitted by said light source into at least one color and a shutter element for selecting the color of said pulses of light conducted by said conducting column.

25. The image scanning assembly as claimed in claim 24, wherein each of said color filter elements comprises red, blue, and green filters for providing red, blue and green light.

26. The image scanning assembly as claimed in claim 24, wherein said shutter element comprises a liquid crystal shutter elements suitable for adjusting the proportion of light passing through said red, green and blue filters.

27. The image scanning assembly as claimed in claim 22, wherein each of said light conducting columns further comprise a polarizer.

28. The image scanning assembly as claimed in claim 22, wherein each of said light conducting columns further comprises a diffuser for diffusing, randomizing and mixing light passing through said shutter element.

29. The image scanning assembly as claimed in claim 22, further comprising a polarizing layer disposed between said plurality of light conducting columns and said plurality of shutter rows.

30. The image scanning assembly as claimed in claim 22, wherein each of said plurality of shutter rows of said shutter assembly comprises an elongated liquid crystal shutter.

31. An integral display and image scanning assembly capable of scanning an image of an object, comprising:
   a light source suitable for emitting pulses of light;
   a light conducting assembly including a plurality of light conducting columns suitable for conducting said pulses of light received from said light source along an axis of the display surface; and
   an optical shutter assembly including a plurality of shutter rows oriented generally perpendicular to said light conducting columns so as to form a plurality of display elements, each shutter row being capable of substantially allowing or blocking transmission of said pulses of light conducted from said light source via said plurality of light conducting columns;
   an optical sensor including plurality of light sensing elements, each of said plurality of light sensing elements capable of sensing light reflected from the object through said plurality of shutter rows via said light conducting columns;
   wherein selected ones of said plurality of shutter rows may be actuated in synchronization with said pulses of light emitted from said light source substantially allowing transmission of said pulses of light through said second layer for illuminating rows of said plurality of display elements in a predetermined sequence for displaying an image; and
   wherein selected ones of said plurality of shutter rows may be actuated in a predetermined sequence and in synchronization with said pulses of light emitted from said light source substantially allowing transmission of said pulses of light through said second layer for allowing transmission of light conducted from said light source via said light conducting assembly for illuminating an object whereupon light reflected from the object is sensed by said plurality of light sensing elements for scanning an image of the object.

32. The integral display and image scanning assembly as claimed in claim 31, wherein each of said plurality of light conducting columns includes a color adjustment assembly for adjusting the color of said pulses of light conducted by said light conducting column.

33. The integral display and image scanning assembly as claimed in claim 32, wherein each of said plurality of said color adjustment assembly includes a color filter for filtering pulses of light emitted by said light source into at least one color and a shutter element for selecting the color of said pulses of light conducted by said conducting column.

34. The integral display and image scanning assembly as claimed in claim 33, wherein each of said color filter elements comprises red, blue, and green filters.

35. The integral display and image scanning assembly as claimed in claim 34, wherein said shutter element comprises a liquid crystal shutter elements suitable for adjusting the proportion of light passing through said red, green and blue filters.

36. The integral display and image scanning assembly as claimed in claim 31, wherein each of said light conducting columns further comprise a polarizer.

37. The integral display and image scanning assembly as claimed in claim 31, wherein each of said light conducting columns further comprises a diffuser for diffusing, randomizing and mixing light passing through said shutter element.

38. The integral display and image scanning assembly as claimed in claim 31, further comprising a polarizing layer disposed between said plurality of light conducting columns and said plurality of shutter rows.

39. The integral display and image scanning assembly as claimed in claim 31, wherein each of said plurality of shutter rows of said shutter assembly comprises an elongated liquid crystal shutter.

40. The integral display and image scanning assembly as claimed in claim 31, wherein each of said plurality of shutter rows is actuated in sequence allowing a user's persistence of vision to form an image.

* * * * *